United States Patent Office 3,823,145
Patented July 9, 1974

---

3,823,145
REMOVAL OF IMPURITIES FROM POLYOLS
Joseph F. Louvar, Lincoln Park, and Newlin S. Nichols, Dearborn, Mich., assignors to BASF-Wyandotte Corporation, Wyandotte, Mich.
No Drawing. Continuation-in-part of abandoned application Ser. No. 747,793, July 26, 1968. This application Mar. 19, 1971, Ser. No. 126,343
Int. Cl. C07c 41/02, 41/12; C07d 51/64
U.S. Cl. 260—268 PL                4 Claims

ABSTRACT OF THE DISCLOSURE

The process for purifying polyoxyalkylene ether polyols containing water-soluble residual catalysts which comprises (1) providing a mixture of water, polyol and a solvent which together with the polyol forms a water-immiscible solution, (2) subjecting the mixture to centrifugal separation whereby the polyol-solvent solution is separated from a water layer and (3) recovering the purified polyol from the polyol-solvent solution by stripping off the solvent.

---

This application is a continuation-in-part of copending application Ser. No. 747,793, filed July 26, 1968 and now abandoned.

Polyoxyalkylene ether polyols hereinafter for convenience called polyols are commonly used in the production of urethane polymers. The said polyols are reacted with polyisocyanates in the presence of added catalysts and other materials to produce the urethane polymers which may be in the form of rubber-like elastomers, foams of flexible or rigid character and the like. In order that urethane polymers of desired properties and characteristics be produced, it is important that the polyols to be reacted with the polyisocyanates be essentially free of impurities which may function as undesirable catalysts or otherwise undesirably in the urethane polymer reaction. Polyols as commercially prepared in crude form contain, for instance, various water-soluble impurities such as alkali metal hydroxides or other metal salts or if acid catalysts are used, acidic materials. The normal concentrations of catalysts range from 1700–3000 parts per million. It is desirable to reduce this to a level of about 10 parts per million. In general, present commercial practices for the removal of water-soluble impurities involve treating the crude polyol with absorbents, commonly clay type absorbents followed by filtration. Such known treatments, while reasonably effective for the removal of undesirable water-soluble impurities from the polyols have serious disadvantages because of economic considerations, for example: cost of polyol losses, cost of absorbent, cost of labor for filtration and cost of absorbent revivification, if efforts are made to re-use the absorbent after it has become spent. Ordinary water-washing of the crude polyols has not proved feasible because of the very small differences in the densities of the polyols and water, and because a number of polyols especially those containing ethylene oxide, form very effective emulsions with the water, and washing proves to be extremely difficult. In addition, the loss of polyol with water makes the practice too costly.

Accordingly, it is a purpose of the instant invention to remove the water-soluble impurities, primarily catalyst, from these polyols by a simple, efficient and effective process.

This and other purposes of the instant invention are accomplished by providing a mixture of water, polyol and a solvent, which solvent together with the polyol forms a solution substantially immiscible with water. The solvent must have a density substantially different from water, must be miscible with the polyols and should be relatively inert with respect to the polyol and water.

The solvent is employed in an amount sufficient to adjust the density differential between the polyol-solvent solution and water to at least the limitations of the centrifuge. The manufacturers recommended minimum density differences range from 0.015 to 0.005 grams per milliliter. The density of the polyols can range from 1.0 to 1.5 or more. The densities of the various solvents employed vary from 0.66 to 0.88 with the exception of the halogenated hydrocarbons whose densities are of order of 1.5–1.6. The density difference between the water and the polyol-solvent solution can be easily adjusted by varying the type and amount of solvent used. The mixture is subjected to centrifugal separation of the polyol-solvent solution from the water. The polyol is then recovered from the polyol-solvent solution by stripping off the solvent. Although, the use of counter-current water during the centrifugal operation is desirable for most efficient catalyst removal, it is not always necessary. A stream of water containing dissolved therein, all of the water-soluble impurities, and a stream of polyol-solvent solution are separately recovered from the centrifugal separation, followed by a separation of the solvent from the polyol-solvent solution by suitable means such as stripping. After separating the solvent from the polyol-solvent solution, the solvent may be re-cycled for use with the next batch of polyol. Although, any potable water may be used, it is preferable to use soft or deionized water with the instant invention.

In general, the impurities present in the polyols which must be removed are catalysts used in the preparation of the polyol. These catalysts are generally alkali metal hydroxides, alkali metal alkoxides, such as sodium hydroxide, potassium hydroxide, sodium alkoxide, potassium alkoxide and so forth. Additional catalysts which may be employed in the preparation of such polyols and which may be removed by the instant process include quaternary ammonium bases and the hydroxides and alkoxides of lithium, rubidium and cesium as well as well-known acid catalysts.

Generally speaking, the polyols purified in accordance with the present invention are those which are characterized as being essentially hydroxyl-terminated polyether polyols and they include the polyoxyalkylene ether glycols which have the general formula $H(OR)_nOH$ where R is an alkylene radical and n is an integer which in a preferred embodiment is sufficiently large that the compound as a whole has a molecular weight of at least 300. The polyols include those prepared by condensing monomeric units such as ethylene oxide, propylene oxide, butylene oxide and mixtures thereof with active hydrogen compounds such as 1,2-propylene glycol, 1,3-propylene glycol, 1,2-butanediol, 1,4-butanediol, 1,3-butanediol, hexanetriol, glycerol, trimethylolpropane, hydroquinone, pentaerythritol, alpha-methyl glucoside, sorbitol and sucrose; acids such as adipic acid, succinic acid, aconitic acid, trimellitic acid, and phosphoric acids; amines such as methyl amine, ethyl amine, ethylene diamine, diethylene triamine, toluene diamine, aniline, methylene dianiline, piperazine, and triisopropanol amine; phenolic compounds such as bisphenol, pyrogallol, resorcinol, inositol; mercaptans such as 1,2-ethanedithiol, and 1,2,3-propanetrithiol, and acid amides such as acetamide and benzyl sulfonamide.

Typical polyols include polyoxypropylene glycol, polyoxybutylene glycol, polytetramethylene glycol block copolymers, e.g. combinations of polyoxypropylene and polyoxyethylene glycols, more specifically those having the general formula:

$$HO(C_2H_4O)_n(C_3H_6O)_m(C_2H_4O)_nH$$

wherein *n* and *m* are together sufficient for attainment of the desired minimum molecular weight, that is about 300. Also included are copolymers of poly-1,2-oxybutylene and polyoxyethylene glycols; and poly-1,4-oxybutylene and polyoxyethylene glycols, and random copolymer glycols prepared from blends, or sequential addition, of two or more alkylene oxides as well as glycols, as described above, capped with ethylene oxide units. The polyols purified in accordance with this invention, can contain arylene or cycloalkylene radicals together with the alkylene radicals as, for example, in the condensation product of a polyoxyalkylene ether glycol with a,a'-dibromo-p-xylene in the presence of a catalyst. In such products, the cyclic groups inserted in the polyether chain are preferably phenylene, naphthalene or cyclohexylene radicals or those radicals containing alkyl or alkylene substituents, as in the tolylene, phenylethylene or xylylene radicals.

Any solvent or solvent mixture which is relatively inert with respect to water, catalyst and the polyol, which has a density substantially different from water, in which the polyol is soluble, and which together with the polyol forms a solution which is immiscible in water, may be employed as a solvent. Solvents which may be employed are the aliphatic, alicyclic, aromatic hydrocarbons, dialkyl ketones, alkanols, dialkyl ethers and halogenated hydrocarbons. These include the butanes, pentanes, heptanes, hexanes, octanes, nonanes, decanes, dodecanes, cyclohexane, methylcyclohexane, cyclopentane, acetone, methylethylketone, butanol, pentanol, isopropanol, methylether, isopropylether, carbon tetrachloride, methylchloroform, dichlorodifloromethane, 1,1,2-trichloro-1,2,2 - trifluoroethane, trichlorofluoromethane, perchloroethylene, benzene, toluene, fluoro, chloro, bromo and ido benzenes and toluenes, ethyl, propyl, butyl, amyl hexyl and benzyl halides, particularly the chlorides, bromides and iodides and mixtures thereof. The preferred solvents are the aliphatic, alicyclic and aromatic hydrocarbons.

The amount of solvent employed should be sufficient to provide a solution of solvent and polyol, which solution has a density differential with respect to water of at least about 0.015 gram per milliliter, and preferably at least about 0.1 gram per milliliter. Although substantially greater amounts may be employed, this merely requires more stripping time for the removal of the solvent.

The polyol-solvent volume ratio can vary from 10:1 to 1:4 but preferably at a level of 5:1 to 1:3. Water soluble organic solvents may also be employed in mixtures with other solvents, if the mixture together with the polyol forms a solution which is immiscible with water. The ratio of components will vary depending on the water solubility of the solvent and the polyol. The polyols which may be purified by this invention appear to be limited only by the extent of their water solubility at the washing temperature. This is a function of the molecular weight, and the ratio of hydrophilic to hydrophobic groups. Polyols composed entirely of hydrophobic groups such as propylene oxide, below a molecular weight of 300 would be excluded from this invention. There is no upper limit to the molecular weight, since the water-solubility of the polyols containing only hydrophobic groups such as propylene oxide decreases with increasing molecular weight, however a practical molecular weight limit is about 26,000. The polyols which contain more than 65% ethylene oxide would also be excluded from this invention since these polyols are too water soluble even at elevated temperatures to permit the removal of the impurities on a practical economical basis.

In the practice of the invention, the polyol may be first mixed with the water after which the solvent is added, or the polyol may be first mixed with the solvent and then water, or all three components could be mixed together simultaneously. The water is added at this stage of the process, generally, in the amount by volume ranging from about 80:1 to 1:50 parts of polyol-solvent per part of water. The mixture of water, solvent and polyol is preferably at a temperature above 20° C. before entering the centrifugal separation step. The temperature range employed has varied from 23° C. to 120° C.

The centrifugal separation step can be carried out with various types of commercial centrifugal separating equipment. The multiple gravitation forces utilized in the operation of such centrifugal separators will generally fall within the range of about 1500 to 16,000 g's, and preferably about 3000 g's, although satisfactory results can be obtained in a centrifugal separator operating at somewhat lesser as well as somewhat greater gravitational forces. The commercial centrifugal separating equipment which is employed should preferably be of a type that permits continuous counter-current washing of the polyol-solvent-water mixture with water in order to improve the washing efficiency. An example of such a commercial separating device is one marketed by Baker Perkins, Inc., Saginaw, Mich., 48605, under the name Podbielniak Contactor, which is disclosed in Bulletin No. P100 dated 1961. The temperature during the continuous separation and water-washing is maintained above 20° C. preferably between 25° C. and 300° C. by conventional means such as one or more of the following: steam jacketed tanks or containers, steam traced conduits or shell and tube heat exchangers. The volume of continuous counter-current wash water added to the centrifuge during the centrifugal separation can vary from 1:20 to 1:0 parts of polyol-solvent to part of water. The water added initially to the polyol-solvent solution may be sufficient to achieve the desired level of catalyst concentration thus making it unnecessary to add counter-current wash water.

The following Examples are provided to further illustrate the invention. In these Examples the polyols designated by letters A, B, etc., are as follows:

Polyol A is a glycerol-propylene oxide-ethylene oxide adduct having a molecular weight of about 3000 and containing about 9% by weight ethylene oxide.

Polyol B is a glycerol-propylene oxide ethylene-oxide adduct having a molecular weight of about 3600 and containing about 3% by weight ethylene oxide.

Polyol C is a glycerol-propylene oxide-ethylene oxide adduct having a molecular weight of about 3700 and containing about 8% by weight ethylene oxide.

Polyol D is a glycerol-propylene oxide-ethylene oxide adduct having a molecular weight of about 2800 and containing about 12% by weight ethylene oxide.

Polyol E is a glycerol-propylene oxide-ethylene oxide adduct having a molecular weight of about 3500 and containing about 4% by weight ethylene oxide units.

Polyol F is a glycerol-propylene oxide-ethylene oxide adduct having a molecular weight of about 3300 and containing about 12% by weight ethylene oxide units.

Polyol G is a polyoxypropylene glycol having a molecular weight of about 2000.

Polyol H is a polyoxypropylene adduct of trimethylolpropane having an average molecular weight of about 4500.

Polyol I is a polyoxyethylene adduct of a polyoxypropylene base having a molecular weight of about 1750 wherein the oxyethylene content is about 10 weight percent of the molecule.

Polyol J is a hydroxypropylated bisphenol A having an average molecular weight of about 400.

Polyol K is a polyoxypropylene adduct of trimethylolpropane having a molecular weight of about 6000.

Polyol L is a glycerol-butylene oxide adduct having a molecular weight of about 2000.

Polyol M is a polyoxypropylene glycol having a molecular weight of about 3000.

Polyol N is a glycerol-propylene oxide adduct having a molecular weight of about 3000.

Polyol O is a trimethylolpropane-propylene oxide-ethylene oxide adduct having a molecular weight of 6000 and containing about 15% by weight of ethylene oxide.

Polyol P is a propylene oxide adduct of pentaerythritol having a molecular weight of about 400.

Polyol Q is a propylene oxide adduct of trimethylolpropane having a molecular weight of about 425.

Polyol R is a polyoxyethylene adduct of a polyoxypropylene base having a molecular weight of about 2000 wherein the oxyethylene content is about 40% by weight.

Polyol S is a polyoxyethylene adduct of a polyoxypropylene base having a molecular weight of about 2500 wherein the oxyethylene content is about 50% by weight.

Polyol T is a polyoxypropylene adduct of ethylene diamine having a molceular weight of about 500.

Polyol U is a trimethylolpropane-propylene oxide-ethylene oxide adduct having a molecular weight of about 3900, containing about 26% by weight ethylene oxide.

Polyol V is a polyoxypropylene glycol having a molecular weight of about 750.

Polyol W is a polyoxyethylene adduct of a polyoxypropylene base having a molecular weight of about 1750 wherein the oxyethylene content is about 50% by weight of the molecule.

Polyol X is a polyoxyethylene adduct of a polyoxypropylene base having a molecular weight of about 1750 wherein the oxyethylene content is about 13% by weight of the molecule.

the pipeline mixer or "Tee" (identified as "Premix Water") and the additional counter-current wash water added at the centrifugal extractor (identified as "Extractor Water") are shown in Table I below. The polyol-hexane solution obtained from the continuous centrifugal separator was stripped of hexane and the hexane was recycled to be used for the next batch of polyol. The amounts of sodium and/or potassium ions shown in Table I below were determined by the following flame test.

This method is based upon a flame photometric analysis of the ash which is derived from the sample. The procedure includes (a) ashing the sample, and (b) a flame photometric analysis of the ash. The Beckman DU Flame Photometer was calibrated with samples of known sodium and potassium contents. The potassium content can also be determined by titration of the sample in an alcohol medium using a dilute acid as a titrant.

In addition, Table I shows the amount of water present in the polyol hexane solution and also the amount of polyol in the water obtained from the centrifugal separator after treatment. As can be seen from Table I, these amounts are very small, thus demonstrating the effectiveness and efficiency of the process of the instant invention.

TABLE I

| Example | Polyol | T., °C. | Solvent | Solvent in polyol (percent by volume) | Polyol-solvent (g.p.m.) | Premix water (g.p.m.) | Extractor water (g.p.m.) | Treated polyol $Na^+ + K^+$ (p.p.m.) | Water in polyol-hexane stream from separator (wt. percent) | Polyol in water stream from separator (wt. percent) |
|---|---|---|---|---|---|---|---|---|---|---|
| 1 | A | 88 | Hexane | 50 | 0.50 | 0.15 | 0.10 | 2 | 1.2 | 0.01 |
| 2 | B | 88 | do | 50 | 0.24 | 0.02 | 0.14 | 2 | 1.3 | 0.02 |
| 3 | C | 88 | do | 50 | 0.12 | 0.03 | 0.07 | 2 | 1.1 | 0.06 |
| 4 | D | 88 | do | 50 | 0.30 | 0.12 | 0.12 | 2 | 1.1 | 0.06 |
| 5 | E | 88 | do | 50 | 0.30 | 0.18 | 0.04 | 2 | 1.1 | 0.06 |
| 6 | D | 88 | do | 50 | 1.35 | 0.45 | 0.33 | 1 | | |

EXAMPLES 1–6

In the examples of Table I below, the respective polyol indicated in the table was mixed with hexane in a 100-gallon steam-jacketed kettle in proportions to provide a polyol-hexane mixture containing 50% hexane by volume. The polyols employed were taken direct from the reactor in which they were prepared. The polyol-hexane mixture and deionized water from a 50-gallon tank were each metered into a pipeline mixer in Examples 1–5 and into a "Tee" in Example 6. The mixture was fed from the pipeline mixer or "Tee" into a continuous centrifugal separator at a temperature of 88° C. which temperature was achieved and maintained by the steam jacket of the kettle and by steam tracing the conduits. The continuous centrifugal separator employed in these examples was produced by Baker Perkins, Inc., Saginaw, Mich. 48605, Podbielniak Contactor, Model No. 6150 as shown in Bulletin No. P100 dated 1961. Additional water was metered from the tank directly into the centrifugal separator which was operated continuously. The rates in gallons per minute of the polyol-hexane mixture, the water mixed therewith in

EXAMPLES 7–28

The compositions of Table II below are water washed according to the procedure described in Examples 1–6 with the exception that solvents other than hexane are employed in Examples 23–28, and in lieu of using a pipeline mixer, water is mixed with the polyol-solvent solution in a kettle and there is no water addition in the line from the kettle to the centrifugal separator. The water is added at a temperature of 88° C. to the polyol-solvent solution, also at 88° C., in a 100-gallon steam-jacketed kettle over a period of 10 minutes. After the addition of water is complete, the water, the polyol and the solvent are all mixed together before the mixture is passed to the centrifugal separator, at the rates of flow shown in Table II below, under the headings "Polyol-Solvent" and "Premix Water." Additional water is continuously added counter-currently in the separator as in the previous Examples at the rates shown in Table II under "Extractor Water."

As in Examples 1–6, the sodium-potassium ion concentration in the final product is very low, as can be seen from Table II, below.

TABLE II

| Example | Untreated polyether Type | Untreated polyether $Na^+ + K^+$ (p.p.m.) | Solvent | Solvent in polyether (percent by volume) | Polyether-solvent (g.p.m.) | Premix water (g.p.m.) | Extractor water (g.p.m.) | Total water/ polyol | Treated polyether $Na^+ + K^+$ (p.p.m.) |
|---|---|---|---|---|---|---|---|---|---|
| 7 | A | 1,900 | Hexane | 50 | 0.296 | 0.09 | 0.14 | 1.5 | Nil |
| 8 | A | 1,900 | do | 50 | 0.296 | 0.09 | 0.14 | 1.5 | Nil |
| 9 | A | 1,900 | do | 50 | 0.296 | 0.09 | 0.14 | 1.5 | Nil |
| 10 | C | 3,000 | do | 50 | 0.296 | 0.09 | 0.12 | 1.4 | 2 |
| 11 | C | 3,000 | do | 50 | 9.296 | 0.09 | 0.12 | 1.4 | 2 |
| 12 | C | 3,000 | do | 50 | 0.296 | 0.09 | 0.12 | 1.4 | 2 |
| 13 | C | 3,000 | do | 50 | 0.296 | 0.09 | 0.12 | 1.4 | 2 |
| 14 | F | 2,000 | do | 40 | 1.63 | 0.48 | 0.54 | 1.2 | 1 |
| 15 | G | 1,800 | do | 40 | 1.88 | 0.56 | 1.12 | 1.8 | 4 |
| 16 | D | 2,000 | do | 50 | 2.0 | 0.16 | 0.94 | 1.1 | 4 |
| 17 | C | 3,000 | do | 50 | 1.3 | 0.065 | 0.66 | 1.1 | 4 |
| 18 | C | 3,000 | do | 50 | 1.36 | 0.0276 | 0.21 | 0.35 | 4 |
| 19 | E | 1,700 | do | 50 | 1.00 | 0.30 | 0.40 | 1.4 | 3 |
| 20 | E | 1,700 | do | 40 | 1.00 | 0.30 | 0.42 | 1.4 | 1 |
| 21 | E | 1,700 | do | 30 | 0.55 | 0.16 | 0.21 | 1.4 | 4 |
| 22 | H | 1,800 | do | 40 | 1.9 | 0.55 | 1.13 | 1.5 | 4 |
| 23 | I | 3,000 | Heptane | 40 | 1.00 | 0.02 | 0.71 | 1.48 | 5 |
| 24 | J | 2,500 | Cyclohexane | 50 | 1.5 | 0.02 | 0.71 | 0.97 | 4 |
| 25 | K | 2,000 | Cyclopentane | 30 | 1.5 | 0.03 | 0.71 | 0.98 | 4 |
| 26 | L | 2,000 | Methylchloroform | 20 | 1.5 | 0.45 | 0.30 | 1.00 | 2 |
| 27 | M | 1,800 | 1,1,2-trichloro-1,2,2-trifluoroethane | 30 | 1.0 | 0.30 | 0.20 | 1.0 | 1 |
| 28 | T | 1,700 | Hexane | 80 | 1.0 | 0.30 | 0.42 | 1.4 | 4 |

EXAMPLES 29–62

In the examples of Table III below, the respective polyol was mixed with water in a kettle using the relative proportions as indicated. The solvents used are as shown. The polyol-water mixture was metered together with the respective solvents into a pipeline mixer. This mixture was then fed into a continuous centrifugal separator at the various temperatures listed. The continuous centrifugal separator employed in these examples was produced by Baker Perkins, Inc., Saginaw, Mich. 48605, Podbielniak Contactor, Model No. A–1, Bulletin CM–169. Additional water was metered into the centrifugal separator in every instance with the exception of Examples 42, 54, 56, 57, 58, 59 and 60. Mixed solvents were used as shown in Examples 32 to 38. The sodium-potassium ion concentration results reveal the desired efficiency was achieved.

polyol-solvent water mixture ranging by volume from 80:1 to 1:50 parts of polyol-solvent per parts of water, (c) effecting centrifugal separation of said polyol-solvent solution from said water at a temperature range from 20° C. to about 300° C.

(d) separately recovering from said centrifugal separation a stream of water containing dissolved therein said water-soluble catalyst impurities and a stream of polyol-solvent solution, and (e) recovering said polyol by removing said solvent.

2. The process of claim 1 wherein the polyol-solvent solution during said centrifugal separation is simultaneously washed with counter-current water.

3. The process of claim 2 wherein said solvent is separated by stripjping.

TABLE III

| Example | Polyol type | Solvent description | Solvent concentration (vol. percent) | T., °C. | Organic (g.p.m.) | Premix H₂O (g.p.m.) | Extractor H₂O (g.p.m.) | Polyol K⁺ + Na⁺ (p.p.m.) | Polyol in H₂O (wt. percent) | Solvent in H₂O (wt. percent) |
|---|---|---|---|---|---|---|---|---|---|---|
| 29 | D | Hexane | 50 | 88 | 0.17 | 0.007 | 0.083 | 2–4 | 0.05 | 0.06 |
| 30 | D | ...do... | 50 | 88 | 0.22 | 0.009 | 0.101 | 4–5 | 0.05 | 0.06 |
| 31 | O | ...do... | 60 | 120 | 0.17 | 0.041 | 0.027 | 5–10 | 2–5 | 0.06 |
| 32 | O | 80% hexane, 20% isopropanol | 60 | 110 | 0.23 | 0.055 | 0.037 | 4 | 0.21 | 18.0 |
| 33 | O | 80% hexane, 20% benzene | 60 | 110 | 0.17 | 0.041 | 0.027 | 3 | 0.3 | 0.2 |
| 34 | O | 80% hexane, 20% acetone | 60 | 110 | 0.20 | 0.048 | 0.032 | 3 | 0.18 | 9.1 |
| 35 | O | 80% hexane, 20% butanol | 55 | 110 | 0.20 | 0.054 | 0.036 | 7 | 0.05 | 5.6 |
| 36 | O | 80% hexane, 20% methylethylketone | 55 | 110 | 0.25 | 0.066 | 0.044 | 6 | 0.52 | 0.12 |
| 37 | O | 80% hexane, 20% ethyl ether | 55 | 110 | 0.30 | 0.08 | 0.05 | 4 | 0.54 | 1–2 |
| 38 | O | 80% hexane, 20% isopropyl ether | 60 | 88 | 0.33 | 0.078 | 0.054 | 10 | 1.4 | 1.4 |
| 39 | O | Benzene | 60 | 88 | 0.43 | 0.052 | 0.12 | 4 | 0.004 | 0.08 |
| 40 | O | Methylethylketone | 60 | 88 | 0.50 | 0.016 | 0.184 | 6 | 0.47 | 3.2 |
| 41 | O | Toluene | 60 | 88 | 0.50 | 0.06 | 0.14 | 4 | 0.01 | 0.09 |
| 42 | O | ...do... | 60 | 88 | 0.47 | 0.028 | None | 4 | 0.036 | 0.087 |
| 43 | N | Cyclohexane | 52 | 88 | 0.31 | 0.09 | 0.06 | 7 | 0.075 | 0.077 |
| 44 | N | Methyl cyclohexane | 52 | 88 | 0.27 | 0.078 | 0.052 | 6 | 0.015 | 0.22 |
| 45 | N | Freon 11-B (trichlorofluoromethane) | 71 | 25 | 0.10 | .008 | 0.06 | 5 | 0.026 | 0.00 |
| 46 | N | Carbon tetrachloride | 60 | 77 | 0.25 | 0.06 | 0.06 | 2 | 0.01 | 0.01 |
| 47 | N | Pentanol | 60 | 88 | 0.36 | 0.082 | 0.06 | 3 | 0.01 | 0.01 |
| 48 | O | ...do... | 65 | 88 | 0.33 | 0.07 | 0.05 | 2 | 0.01 | 0.01 |
| 49 | R | Toluene | 50 | 88 | 0.24 | 0.01 | 0.11 | 6 | 0.051 | 0.16 |
| 50 | Q | ...do... | 55 | 88 | 0.42 | 0.12 | 0.08 | 4 | 0.16 | 0.15 |
| 51 | G | Hexane | 40 | 88 | 0.21 | 0.07 | 0.04 | 4 | 0.017 | 0.12 |
| 52 | G | Toluene | 40 | 88 | 0.21 | 0.07 | 0.04 | 4 | 0.004 | 0.088 |
| 53 | G | Hexane | 20 | 88 | 0.17 | 0.07 | 0.04 | 6 | 0.028 | 0.066 |
| 54 | U | Toluene | 60 | 88 | 0.33 | 0.010 | None | 1.1 | 0.18 | 0.035 |
| 55 | V | ...do... | 60 | 88 | 0.36 | 0.010 | .12 | 1.75 | 0.1 | 0.8 |
| 56 | V | ...do... | 60 | 88 | 0.33 | 0.078 | None | 1.75 | 0.3 | .08 |
| 57 | V | ...do... | 60 | 88 | 0.33 | 0.013 | None | 2.3 | 0.3 | .08 |
| 58 | V | ...do... | 60 | 88 | 0.33 | 0.023 | None | 2.0 | 0.3 | .08 |
| 59 | N | ...do... | 60 | 88 | 0.33 | 0.13 | None | 2.0 | 0.3 | .08 |
| 60 | N | ...do... | 60 | 88 | 0.33 | 0.010 | None | 4.5 | 0.3 | .08 |
| 61 | W | ...do... | 65 | 88 | 0.43 | 0.010 | .12 | 8.5 | 0.2 | .080 |
| 62 | X | ...do... | 65 | 88 | 0.33 | 0.009 | .10 | 2.1 | 0.12 | .036 |

What is claimed is:

1. A process for purifying polyoxyalkylene ether polyols prepared by condensing ethylene oxide, propylene oxide, butylene oxide and mixtures thereof with active hydrogen compounds selected from the group consisting of ethylene glycol, propylene glycol, butanediol hexanetriol, glycol, trimethylolpropane, hydroquinone, pentaerythritol, sorbitol, ethylenediamine, diethylenetriamine, toluenediamine, aniline, piperazine, trisopropanolamine, bisphenol A, pyrogallol, resorcinol and inositol, containing water-soluble residual catalyst impurities, said polyols having a molecular weight range of 300 to about 26,000 and containing less than 65% ethylene oxide which comprises (a) providing, at a temperature range from 20° C. to 120° C., a mixture of water, said polyol and a solvent, in which said polyol is soluble and which is relatively inert with respect to the polyol and the water, and which solvent has a density such that the polyol-solvent solution has a density differential with respect to water of at least about 0.1 gram per milliliter, said solvent selected from a group consisting of aliphatic, alicyclic and aromatic hydrocarbons, alkanols, dialkyl ketones, dialkyl ethers, halogenated hydrocarbons and mixtures thereof, wherein the polyol-solvent volume ratio is from 10:1 to 1:4, (b) forming a polyol-solvent solution which is sub-stantially immiscible in water, the amount of water in said 4. The process of claim 2 wherein said solvent is recycled.

References Cited

UNITED STATES PATENTS

| | | | |
|---|---|---|---|
| 2,228,929 | 1/1941 | Reibnitz | 260—410 |
| 3,356,738 | 10/1967 | Hauser et al. | 260—615 B |
| 2,425,755 | 8/1947 | Roberts et al. | 260—615 B |
| 2,425,845 | 8/1947 | Toussaint et al. | 260—615 B |
| 3,299,151 | 1/1967 | Wismer et al. | 260—615 B |
| 2,723,294 | 11/1955 | Benoit | 260—615 B |
| 2,665,061 | 1/1954 | Steindekeo et al. | 23—269 |

FOREIGN PATENTS

| | | | |
|---|---|---|---|
| 711,316 | 6/1954 | Great Britain | 23—269 |
| 711,252 | 6/1954 | Great Britain | 23—269 |
| 601,604 | 5/1948 | Great Britain | 260—615 B |

OTHER REFERENCES

Todd: Chemical Engineering Progress, 62, No. 8 (1966), pp. 119–124.

HOWARD T. MARS, Primary Examiner

U.S. Cl. X.R.

210—78; 260—209 R, 210 R, 521 R, 537 R, 537 N, 556, 561, 609 E, 950, 990, 613 B, 615 B

PO-1050
(5/69)

UNITED STATES PATENT OFFICE
CERTIFICATE OF CORRECTION

Patent No. 3,823,145        Dated July 9, 1974

Inventor(s) Joseph F. Louvar and Newlin S. Nichols

It is certified that error appears in the above-identified patent and that said Letters Patent are hereby corrected as shown below:

Claim 1 lines 54 and 55 should read
"ethylene glycol, propylene glycol, butanediol, hexanetriol, glycerol, trimethylolpropane, hydroquinone, pentaerythritol,"

Signed and sealed this 22nd day of October 1974.

(SEAL)
Attest:

McCOY M. GIBSON JR.
Attesting Officer

C. MARSHALL DANN
Commissioner of Patents